(12) United States Patent
Le et al.

(10) Patent No.: US 10,755,023 B1
(45) Date of Patent: Aug. 25, 2020

(54) CIRCUIT TIMING ANALYSIS

(71) Applicant: Synopsys, Inc., Mountain View, CA (US)

(72) Inventors: Jiayong Le, Santa Clara, CA (US); Gregory Schulte, Santa Clara, CA (US); Brandon Thompson, San Jose, CA (US); Richard Moloney, Wicklow (IE); Adrian Wrixon, Dublin (IE)

(73) Assignee: Synopsys, Inc., Mountain View, CA (US)

(*) Notice: Subject to any disclaimer, the term of this patent is extended or adjusted under 35 U.S.C. 154(b) by 20 days.

(21) Appl. No.: 15/940,963

(22) Filed: Mar. 29, 2018

Related U.S. Application Data

(60) Provisional application No. 62/480,238, filed on Mar. 31, 2017.

(51) Int. Cl.
*G06F 30/394* (2020.01)
*G06F 111/04* (2020.01)
*G06F 111/20* (2020.01)
*G06F 119/12* (2020.01)

(52) U.S. Cl.
CPC ........ *G06F 30/394* (2020.01); *G06F 2111/04* (2020.01); *G06F 2111/20* (2020.01); *G06F 2119/12* (2020.01)

(58) Field of Classification Search
CPC ............ G06F 2217/02; G06F 2217/06; G06F 2217/84; G06F 17/5031; G06F 17/5068; G06F 30/3312; G06F 30/394; G06F 2111/04; G06F 2111/20; G06F 2119/12
USPC ......................................... 716/103, 113, 122
See application file for complete search history.

(56) References Cited

U.S. PATENT DOCUMENTS

2008/0216040 A1* 9/2008 Furnish ............... G06F 17/5068
716/122

* cited by examiner

*Primary Examiner* — Paul Dinh
(74) *Attorney, Agent, or Firm* — HIPLegal LLP; Judith Szepesi

(57) ABSTRACT

An arrival time propagation method and system for statistical circuit analysis that uses a conjugation operation and a negation operation to determine and adjust arrival times in a circuit model and to determine path ordering in a circuit.

21 Claims, 17 Drawing Sheets

| Graph/path bounding issue | Total Num end-points | Num end-points non-bounding Reduction | Number of end-points becoming more pessimistic | Worst in-curred pess-imism | Avg in-curred pess-imism | Number of end-points becoming more opti-mistic | Worst in-curred opti-mism |
|---|---|---|---|---|---|---|---|
| Results | 96783 | 248->11 | 841625 | 5.18ps | 0.1ps | 5947 | 0.8ps |
| | 5 | | | | | | |

Figure 4F

| | Prior Art Process | | | New Process | | |
|---|---|---|---|---|---|---|
| Design | # of End points | # of Outliers | Largest Outlier | # of End points | # of Outliers | Largest Outlier |
| Customer A | 899700 | 32111 | 58.1ps | 899700 | 0 | - |
| Customer B | 12579 | 33 | 82ps | 12579 | 0 | - |
| Customer C | 190422 | 97 | 8ps | 190422 | 0 | - |

Figure 7E

CIRCUIT TIMING ANALYSIS

RELATED APPLICATION

The present application claims priority to U.S. Provisional Application No. 62/480,238 filed on Mar. 31, 2017, and incorporates that application by reference in its entirety.

FIELD

The present invention relates to circuit timing, and more particularly to improving graph-based analysis in circuit timing analysis.

BACKGROUND

In many technical areas, such as mobile, wearable, and IoT platforms it is desirable to reduce circuit supply voltage, leading to a significant increase in circuit variability. Increased circuit variability impacts the operating frequency of the circuit.

Currently, static timing analysis is commonly used to verify circuit operating frequency (also called circuit timing). Various modeling techniques are used to accurately capture the variable impact on circuit timing. As an example, the Parametric On-Chip Variation (POCV) model is widely used for variation-aware timing analysis.

In static timing analysis, a timing graph is built for the circuit under analysis. The edges on the timing graph are called timing arcs. During static timing analysis, delays of the timing arcs are calculated and propagated through the timing graph. During propagation, delays are added to the arrival time of an input node to get the arrival time at an output node. Arrival times from different edges to the same node are merged into one arrival time through min/max operations. Once the propagation is done, critical paths are extracted from the timing graph for further analysis. It is critical that the graph-based timing analysis (GBA) results bound the path-based timing analysis (PBA) results. Bounding is defined as ensuring that the results from GBA are always more pessimistic than the results from PBA. Paths can be extracted in a strictly monotonic order based on their criticality. Otherwise, a circuit designer may miss a timing-critical area of the circuit, resulting in a defective circuit design.

With the POCV model, the timing information of arcs, paths and whole timing graph are described as statistical distributions instead of scalar values. Existing graph merging and path searching methods can no longer ensure that GBA results bound PBA results and the correct ordering of the critical path extractions. To work around this issue, a designer may add empirical margins during path reporting, which can be very expensive in terms of run time and memory consumption.

BRIEF DESCRIPTION OF THE FIGURES

The present invention is illustrated by way of example, and not by way of limitation, in the figures of the accompanying drawings, in which like reference numerals refer to similar elements and in which:

FIG. 4F is an exemplary comparison between path and graph results for all end-point slacks with and without the invented statistical min/max operations.

FIG. 7E is a table showing results from three in-house designs with and without utilizing the present process.

DETAILED DESCRIPTION

The present application addresses a critical problem with circuit design technologies. When users utilize Parametric On-Chip Variation model or a location validation function, it sometimes results in missing critical paths and wrong path ordering. This means that during the integrated circuit design process, the users cannot sign-off the chip with confidence. This problem arises from the challenge of statistical graph merging and path tracing on statistical timing graph. In order to enable deterministic timing sign-off flow from the underlying statistical timing analysis, the process described utilizes the moment conjugation method to ensure that the statistical graph slack bounds the path slack. In one embodiment, a novel statistical slack adjustment process is used to ensure that the critical path slack matches the graph slack. This solves a technical problem during the integrated circuit design process, which leads to faster validation and faster completion of the design, speeding up the process from concept to manufacturing.

The following detailed description makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the disclosure. The following detailed description is, therefore, not to be taken in a limiting sense, and the scope of the present invention is defined only by the appended claims.

Figure 1:
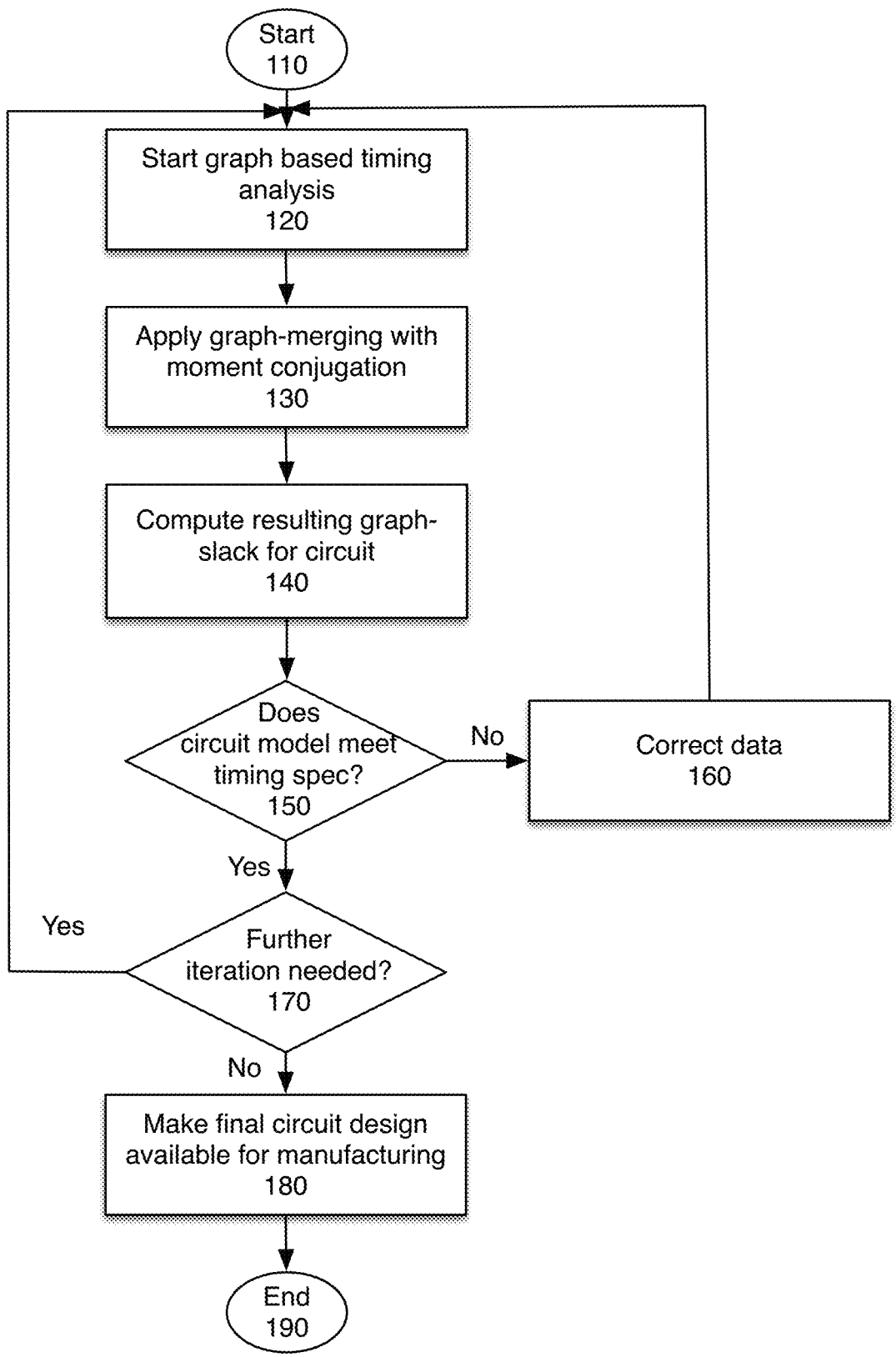
FIG. 1 is a flowchart of an overview of one embodiment of a method for statistical graph merging using a moment conjugation and moment negation operation to ensure that the statistical graph slack bounds the path slack.

FIG. 1 is a flowchart of embodiment of a method for statistical graph merging using a moment conjugation and moment negation operation to ensure that the statistical graph slack bounds the path slack. The slack associated with each connection is the difference between the time available for the signal to traverse the connection and the actual arrival time. A positive slack implies that the arrival time at that node may be increased without affecting the overall delay of the circuit. Conversely, negative slack implies that a path is too slow, and the path should be sped up (or the reference signal delayed) if the whole circuit is to work at the desired speed. The statistical graph slack is the statistical min-max of the arrival times within the graph of the connections. The statistical graph slack bounds the path slack when the path slack is lower than the statistical graph slack.

The described embodiments of the system are implemented using software. It is not practicable or possible for a human designer to perform circuit analysis or timing analysis by hand using paper and pencil, in a reasonable amount of time. Circuits being designed by circuit designers today are very large and the only practicable way to analyze such large circuit designs is to use software executed by a computer. A typical circuit for which the present invention might be used will have at least ten thousand circuit elements and more often hundreds of thousands of elements whose timing is calculated. The speed and accuracy afforded by timing analysis software allow large, complex circuits to be analyzed in a reasonable amount of time, something that a human working by hand could never to manage. By incorporating the specific features of the rules the present claims are limited to a specific process for automatically ordering paths using statistical graph merging, using particular information and techniques. It does not preempt approaches that use rules of a different structure or different techniques. The present application is therefore directed to a patentable, technological improvement over the existing, manual timing analysis techniques. The application uses the limited rules in a process specifically designed to achieve an improved technological result in conventional industry practice.

The process starts at block 110. After graph based timing analysis is started, at block 120, the method applies graph merging with moment conjugation and moment negation, at block 130, as described in more detail below, with respect to FIG. 2. Returning to FIG. 1, next, a resulting graph slack is determined for the circuit, at block 140. Then the circuit model is checked to determine if it meets a timing specification, at block 150. In one embodiment, if the timing specification is not met, as determined at block 150, the circuit model fails the timing analysis, and needs to be corrected. Thus, the process makes an adjustment, at block 160, and returns to block 120. This process may be iterated (block 170) on each change of the circuit design, until all timing and other specifications are met by the final circuit design. The final circuit design is then made available for manufacturing, at block 180. The process then ends at block 190.

Figure 2:
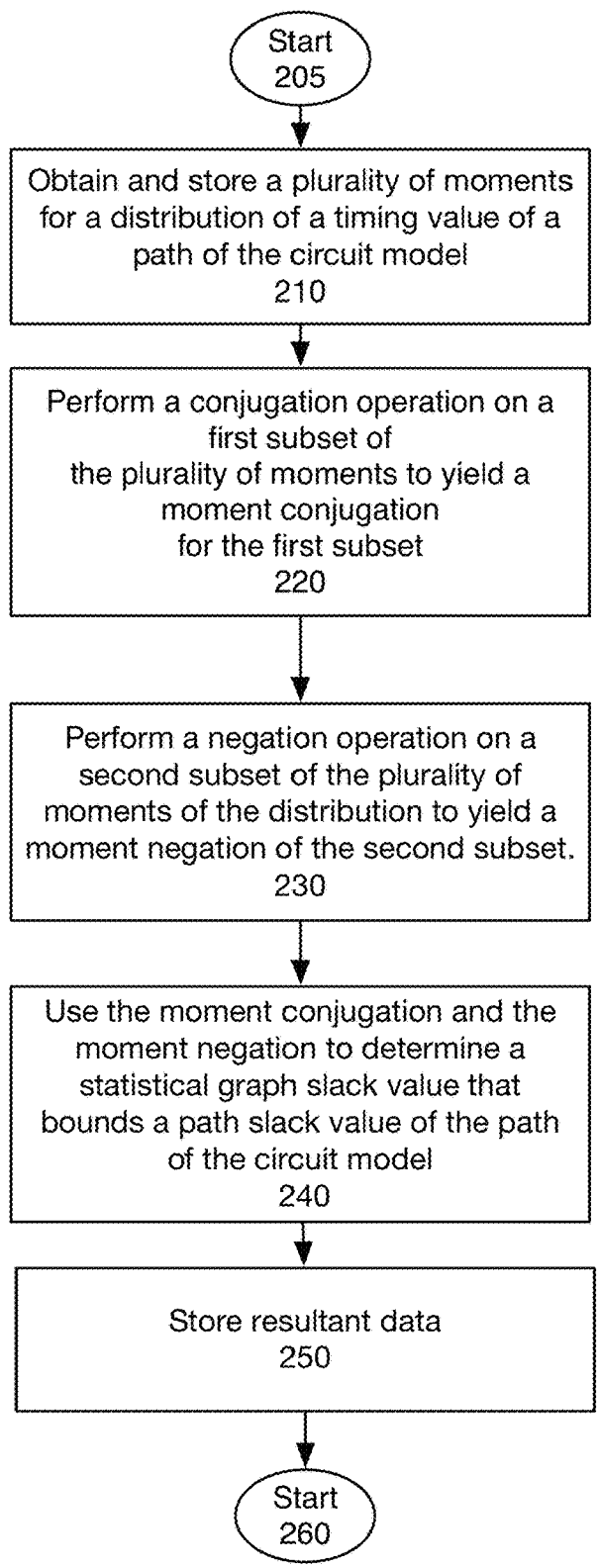
FIG. 2 is a flowchart showing one embodiment of the details of graph merging with moment conjugation from FIG. 1.

FIG. 2 is a flowchart showing one embodiment of details of graph merging with moment conjugation. In one embodiment, this corresponds to block 130 from FIG. 1. The present system discusses to an arrival time propagation method that ensures the results from graph-based analysis will bound path-based analysis with a very tight bounding margin. It also provides path tracing method to ensure paths are extracted in their strict order based on their slack value.

"Slack" defines the maximum delay a signal can tolerate for the circuit still meet the timing spec. When slack becomes negative, it means the signal comes too late and the timing spec won't be met. A "critical path" is a path through the circuit which has the longest delay. The described embodiments can be used with both scalar timing values and statistical timing distributions.

In one embodiment, a new statistical graph merging (a.k.a. statistical min/max operation), that can provide graph-based analysis results bound path-based results. The statistical graph merging provides a method to handle common path pessimism removal and transparent latch analysis. As discussed in connection with FIGS. 5-7, certain embodiments also contain a new method for statistical path extraction, which provides extracted paths that have monotonic order. The statistical path extraction method, in one embodiment, creates the continuity of the path slacks for the extracted paths.

At block 210, a plurality of moments for a distribution of a timing value of a path of the circuit model are obtained. In one embodiment, these values are obtained from memory. The definition of statistical negate operator and conjugate operator on the statistical variable that is defined by its moments (a.k.a. mean, standard deviation, skewness, kurtosis, . . . , etc) as is shown in equation (1). Equation (2) gives the definition of negation, where the negation operator flips the sign of odd-th number of moments. Equation (3) gives the definition of conjugation, where the conjugation operator flips the sign of even-th number of moments $$\text{Define statistical variable } X=\{\text{mean,stddev,skewness,} \\ \text{kurtosis}, \ldots k_{th} \text{ moment}\} \quad (1)$$

$$\text{Negate}(X)=-X=\{-\text{mean,stddev},-\text{skewness,} \\ \text{kurtosis}, \ldots (-1)^{k} k_{th} \text{ moment}\} \quad (2)$$

$$\text{Conjugate}(X)=X^{*}=\{\text{mean},-\text{stddev,} \\ \text{skewness},-\text{kurtosis}, \ldots (-1)^{k+1} k_{th} \text{ moment}\} \quad (3)$$

In one embodiment, the system uses a statistical max operator. Given two statistical arrival times A and B, and assuming they share the same common arrival time C, conventional methods propose a statistical max operator that matches the mean and corner of the two input distributions. It works well with Clock-Reconvergence Pessimism Removal (CRPR). However, with CRPR the statistical max operator is no longer guaranteed to be pessimistic compared with path-based analysis results. In one embodiment, the system determines a new statistical max operator which is a transformation of the reference max operator in equation [1] above using negation and conjugation operators.

$$\text{NewMax}(A,B)=C+\text{Max}(A-C^{*},B-C^{*})$$

Instead of only considering two input variables, the new statistical max operations consider three input variables, with the $3^{rd}$ one as the common variation of the original two input variables. Note that the new max operator provides an upper bound for the original operator. The proof is listed below.

Given A={$\mu\_a$, $\sigma\_a$}, B={$\mu\_b$, $\sigma\_b$}, C={$\mu\_c$, $\sigma\_c$}, without loss of generality assuming $\mu\_a > \mu\_b$, $\mu\_a + k\ \sigma\_a < \mu\_b + k\ \sigma\_b$.

By definition:

Mean(NewMax(A,B))−Mean(Max(A,B))=μ$_a$−μ$_a$=0

From this it be derived that:

$$\text{Var}(New\text{Max}(A, B)) - \text{Var}(\text{Max}(A, B)) = 2\left(\sigma_b - \sqrt{\sigma_b^2 - \sigma_c^2}\right)\frac{(\mu_a - \mu_b)}{k} \geq 0$$

The comparison equations above show that the NewMax merging operator provides an upper bound of the reference max operator in [1]

Some of the described embodiments use "moment conjugation." At block 220, the process performs a conjugation operation on a first subset of the plurality of moments to yield a moment conjugation for the first subset. Statistical distributions can be described by their probability density function (PDF). A PDF includes the distribution's statistical moments such as mean, standard deviation, skewness, kurtosis, etc. The PDF may include N moments. Due to its compact form, the moment-based description is widely used in variation-aware Static Timing Analysis (STA) methods such as POCV. Moment conjugation is an operation that flips the sign of even-th number of moments for a given statistical distribution. A similar concept, moment negation, is an operator that flips the sign of odd-th number of the moments for a given statistical distribution. Thus, at block 230, a negation operation is performed on a second subset of the plurality of moments of the distribution, to yield a moment negation of the second subset.

The moment conjugation and moment negation is used to determine the statistical graph slack value, at block 240. A new statistical min/max operation is used based on moment conjugation and moment negation, which transfer the variation of two input arrival times into common portion of the path and non-common portion of the path and apply min/max on the non-common portion. By doing so it can provide graph-based results that are of comparable accuracy to bounding path-based results. The resultant data is stored at block 250. The process then ends.

As will be discussed in connection with FIGS. 5-7 below, in one embodiment, a new path-searching method may also be used in conjunction with moment conjugation and moment negation. The new path searching method, in one embodiment, bridges path slack with graph-slack utilizing a statistical slack adjustment computed based on moment conjugation and negation. With statistical slack adjustment, the method is designed to have the paths extracted in their slack order.

By maintaining GBA/PBA bounding and the monotonic order of extracted paths, the described embodiments help the circuit designer analyze their circuit properly and avoid potential defects in their circuit. Otherwise, a circuit designer either needs to use big margins which will increase run time and introduce pessimism, or may put their circuit quality at risk.

Figure 3A:
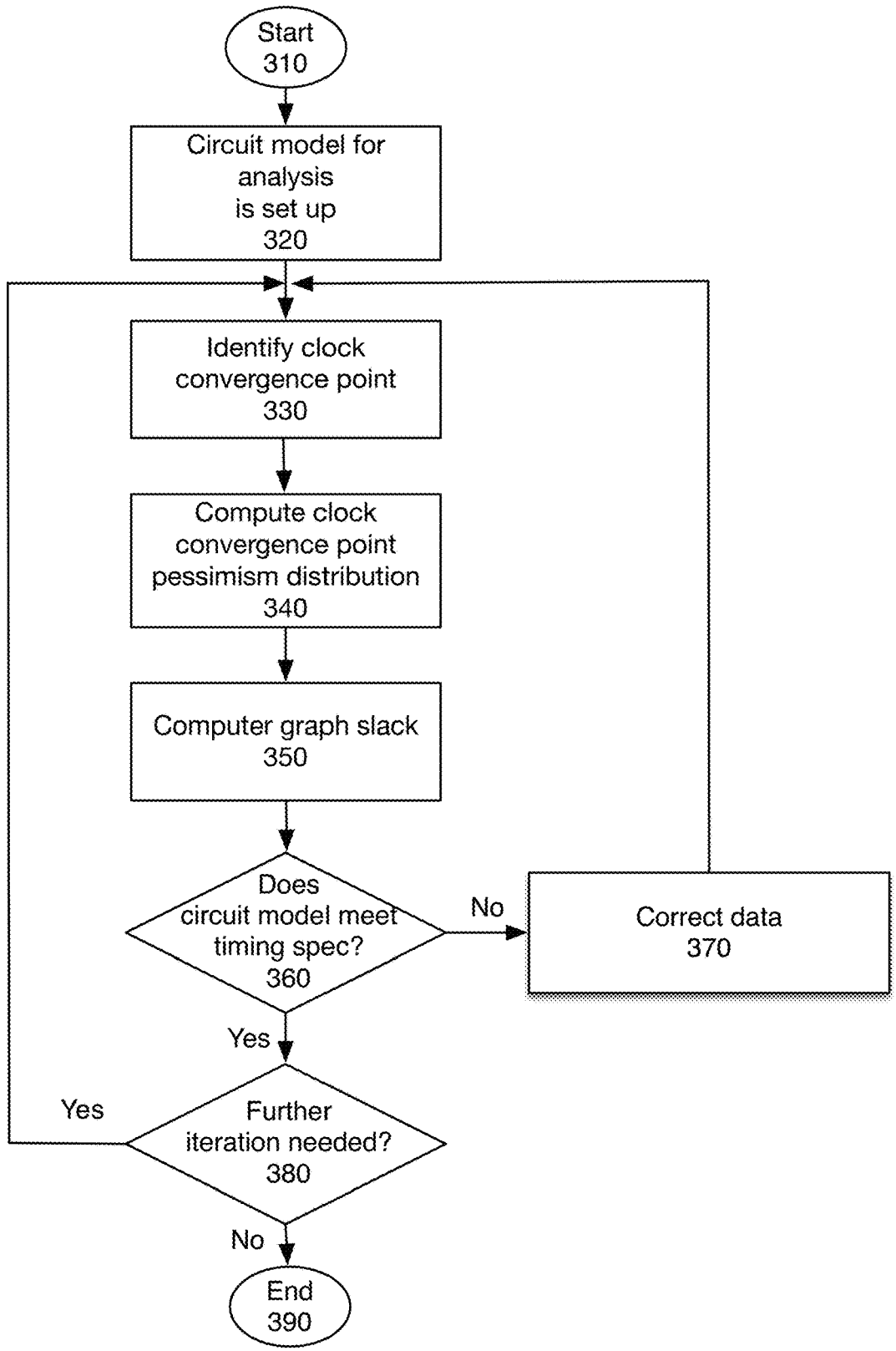
FIG. 3A is a flowchart showing one embodiment of an enhanced opposite-edge CRP variation computation method to ensure accurate common variation removal.

FIG. 3A is a flowchart showing one embodiment of an enhanced opposite-edge CRP variation computation method to ensure accurate common variation removal. This method accurately computes common path variation. The process starts at block 310. At block 320, the circuit model is set up for analysis. At block 330, the process identifies a clock convergence point in a circuit clock network structure. The process then computes a clock convergence point pessimism distribution, at block 340. In one embodiment, this calculation is done by applying an opposite edge CRP distribution computation method. The process then computes graph slack, at block 350. In one embodiment, this is done by applying the computed CRP distribution while computing graph slack. The process then determines whether the circuit model meets a timing spec, at block 360. If not, at block 370 a correction is applied, at the process returns to block 330 to iterate after adjustments. Note that while the flowchart is shown as an immediate loop the process may perform other processes before re-computing these values. If so, at block 380 the process determines whether further iteration is needed. If so, the process returns to block 360. Otherwise, the process ends at block 390.

Figure 3B:
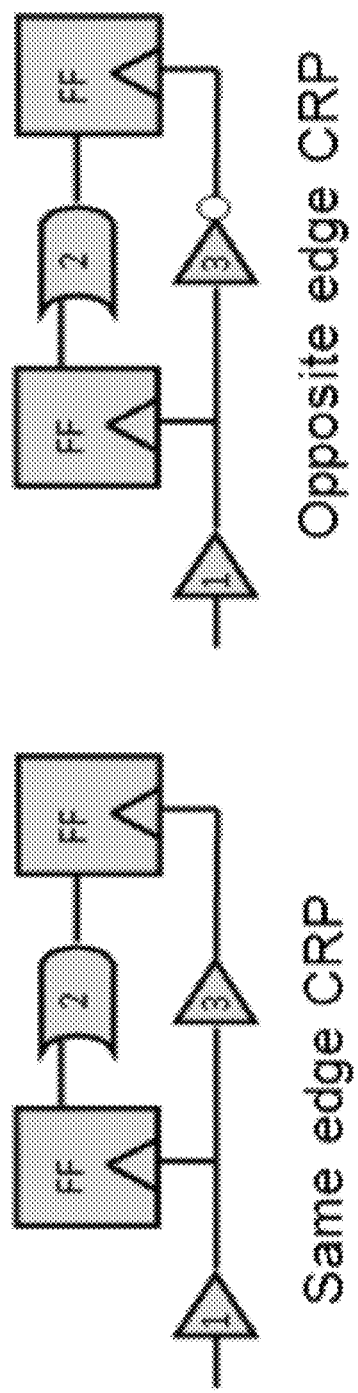
FIG. 3B above shows an exemplary basic circuit structure demonstrating same edge CRP and different edge CRP.

FIG. 3B shows an exemplary basic circuit structure demonstrating same edge CRP and different edge CRP. When launch and capture flops are triggered by different clock edges, prior art CRP calculations compute the statistical minimum of rising CRP and falling CRP, which does not match common path variation.

The CRP calculation in one embodiment directly combines variation from proper signal arrival times, and ensures accurate variation computation. The equations below give one embodiment of detailed computation for the improved CRP calculation method, where p and a is the nominal and sigma of distribution and Index arr_[rise|fall] [early|late] are the related min/max rise/fall arrival times on the CRP points.

$$\mu_{crp} = \text{Min}(\mu_{arr\_rise\_late} - \mu_{arr\_rise\_early}, \mu_{arr\_fall\_late} - \mu_{arr\_fall\_early})$$

$$\sigma_{crp}^2 = \sigma_{arr_{rise\_late}}^2 + \sigma_{arr_{fall\_late}}^2$$

Figure 4A:
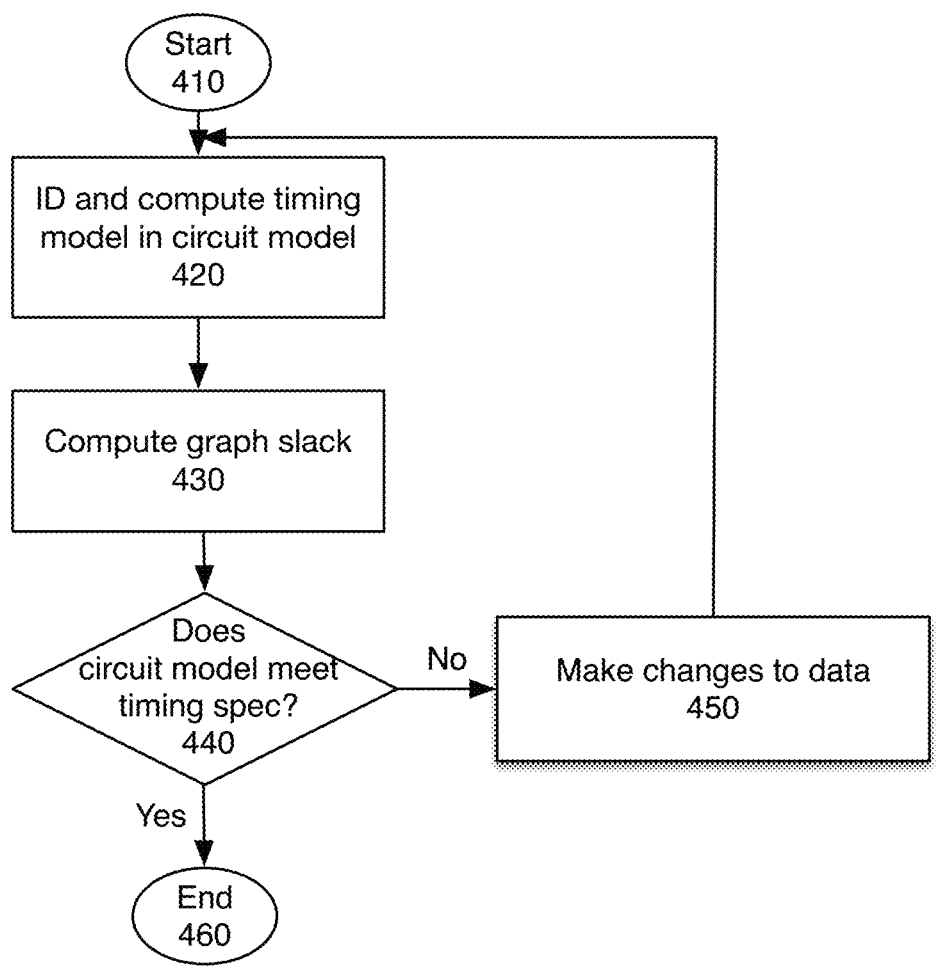
FIG. 4A is a flowchart showing one embodiment of the minimum-required variation propagation for transparent latch analysis to ensure accurate CRP variation reduction for forwarding paths.

FIG. 4A is a flowchart showing one embodiment of minimum-required variation propagation for transparent latch analysis to ensure accurate CRP variation reduction for forwarding paths. The method, at block 420, identifies and computes transparent latch gate timing model in the circuit by computing a transparent latch forwarding arrival time considering CRP variation. It then computes graph slack, at block 430. It then checks to see if the circuit model meets a timing spec at block 440. If not, it makes changes at block 450 and returns to block 420 to re-compute. Note that while the flowchart is shown as an immediate loop the process may perform other processes before re-computing these values. Otherwise, it ends at block 460.

Figure 4B:
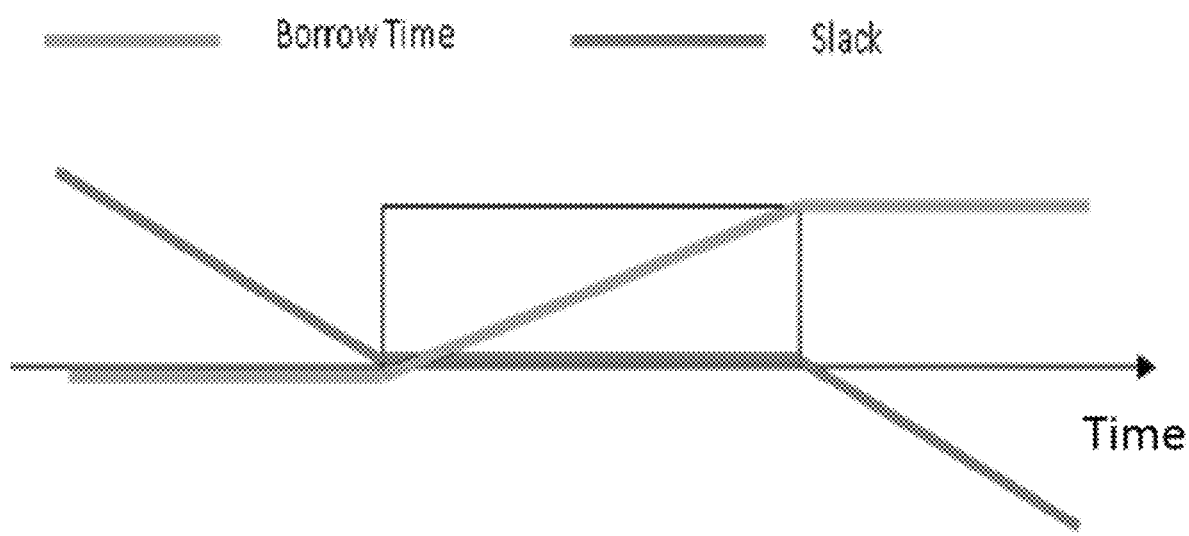
FIG. 4B demonstrates an exemplary borrowing behavior in transparent latch.
Figure 4C:
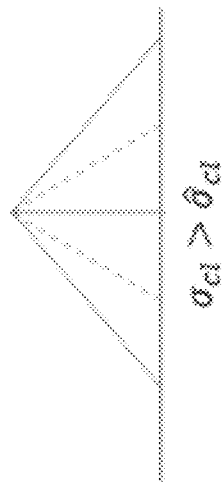
FIGS. 4C-4E illustrate the new borrow time variation (dot) vs. old borrow time variation (line).
Figure 4D:
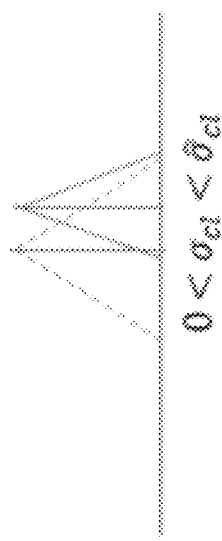
Figure 4E:
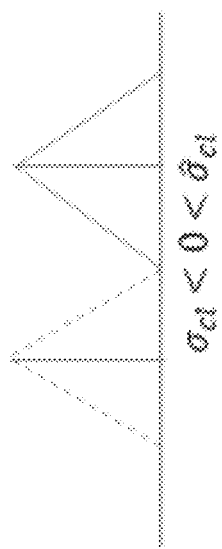

The method of FIG. 4A shows new borrowed time variation model with min variation bound. FIG. 4B demonstrates an exemplary borrowing behavior in transparent latch. A conventional borrow calculation launches a closing edge of the clock signal instead of actual arrival time when the actual arrival time signal comes later than the closing edge of the clock. In one embodiment, a borrowed time calculation method creates the minimum-required variation for borrow calculation to ensure continuity and bounding for forwarding paths. FIGS. 4C-4E illustrate the new borrow time variation (dot) vs. old borrow time variation (line).

The equations below show one embodiment of the detailed calculation of the new borrowing time, where ĉl is the proposed closing edge, cl is the existing calculated closing edge and p and a is the nominal and sigma. FIGS. 4C-4E give the comparison between the conventional borrow time variation and new borrow time variation.

$$\hat{c}l = (\hat{\mu}_{cl}, \hat{\sigma}_{cl})$$

$$\hat{\sigma}_{cl} = \sigma_{crp_{arr}} \leq \sigma_{arr}$$

$$\hat{\mu}_{cl} = \min(\mu_{cl}, \mu_{cl} + N^*(\sigma_{cl} - \hat{\sigma}cl))$$

FIG. 4F is an exemplary comparison between path and graph results for all end-point slacks with and without the invented statistical min/max operations. These results demonstrate that the min/max operators used in the described embodiments significantly reduce the non-bounding number of the endpoints.

Figure 5:
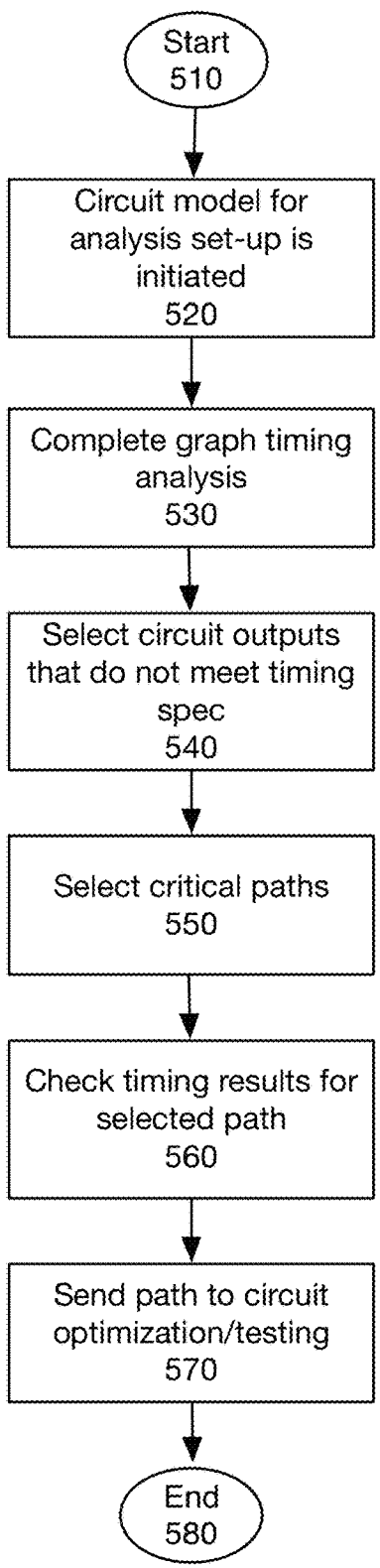
FIG. 5 is a flowchart showing one embodiment of a method of statistical slack adjustment to guarantee critical path slack matches graph slack.

FIG. 5 is a flowchart showing one embodiment of a method of statistical slack adjustment so critical path slack matches graph slack. The process starts at block 510. To set up a circuit model for analysis, the method initiates the set-up (block 520), completes a graph timing analysis (block 530), selects circuit output that does not meet the timing spec (block 540), selects critical paths with moment conjugation (and negation) method to match graph slack distribution (block 550), checks the timing results for the selected path (block 560), and sends the path to circuit optimization and/or circuit testing (block 570). In one embodiment, if the timing results for the selected path do not meet the criteria, the design may be altered and reevaluated before it is sent to circuit optimization/testing.

Figure 6:
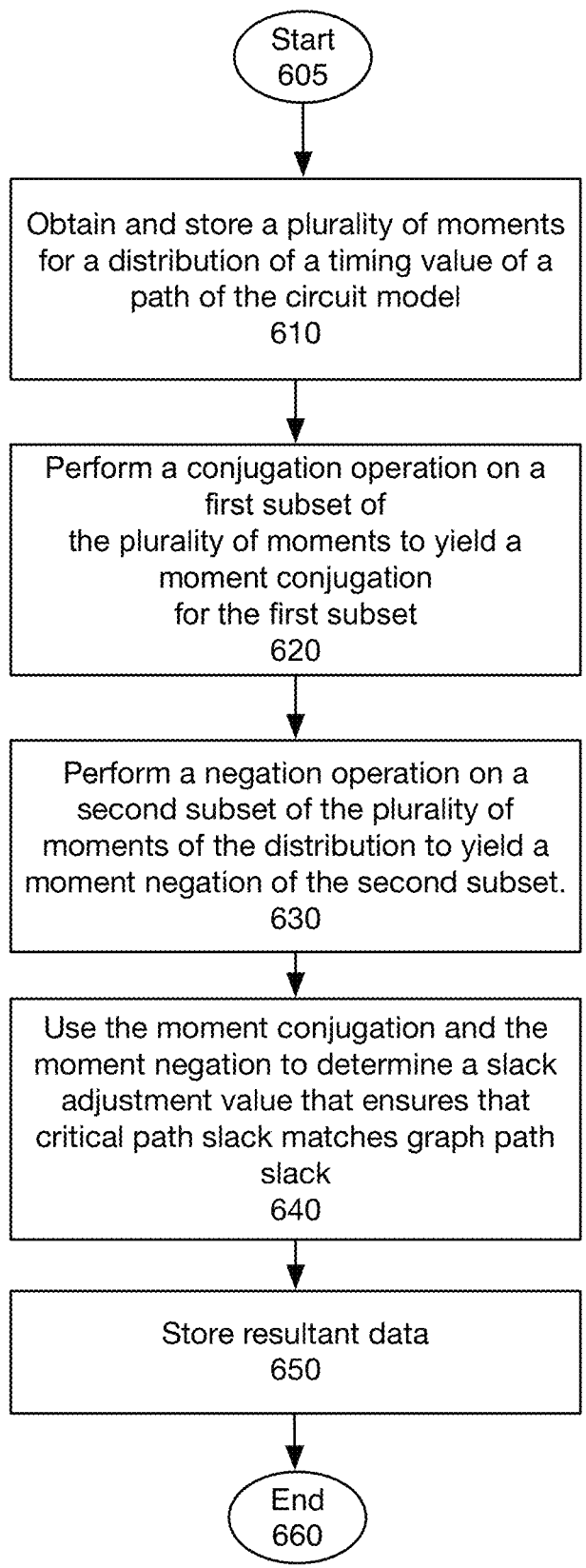
FIG. 6 is a flowchart showing one embodiment of details of selecting critical paths with moment-conjugation method to match graph slack distribution from FIG. 5.

FIG. 6 is a flowchart showing details of one embodiment of selecting critical paths with moment-conjugation method to match graph slack distribution from FIG. 5. In one embodiment, the system employs a statistical slack adjustment approach to guarantee that critical path slack matches graph slack and proper order for the extracted paths.

Path slack distribution can be smaller than graph slack in SSTA, which can cause path tracing/sorting issue for designers. In one embodiment, a novel statistical graph slack concept used and statistical slack adjustment is added during path construction to bridge the gap between path slack and graph slack. This naturally resolves path sorting and tracing issue and enable designers to properly analyze and improve their design.

At block 610, a plurality of moments for a distribution of a timing value of a path of the circuit model are obtained. In one embodiment, these values are obtained from memory.

At block 620, the process performs a conjugation operation on a first subset of the plurality of moments to yield a moment conjugation for the first subset. At block 630, a negation operation is performed on a second subset of the plurality of moments of the distribution, to yield a moment negation of the second subset.

The moment conjugation and moment negation is used to determine a slack adjustment value that ensures that the critical path slack matches the graph path slack, at block 640. The resultant data is stored at block 650. The process then ends.

By maintaining GBA/PBA bounding and the monotonic order of extracted paths, the described embodiments help the circuit designer analyze their circuit properly and avoid potential defects in their circuit. Otherwise, a circuit designer either needs to use big margins which will increase run time and introduce pessimism, or may put their circuit quality at risk.

Figure 7A:
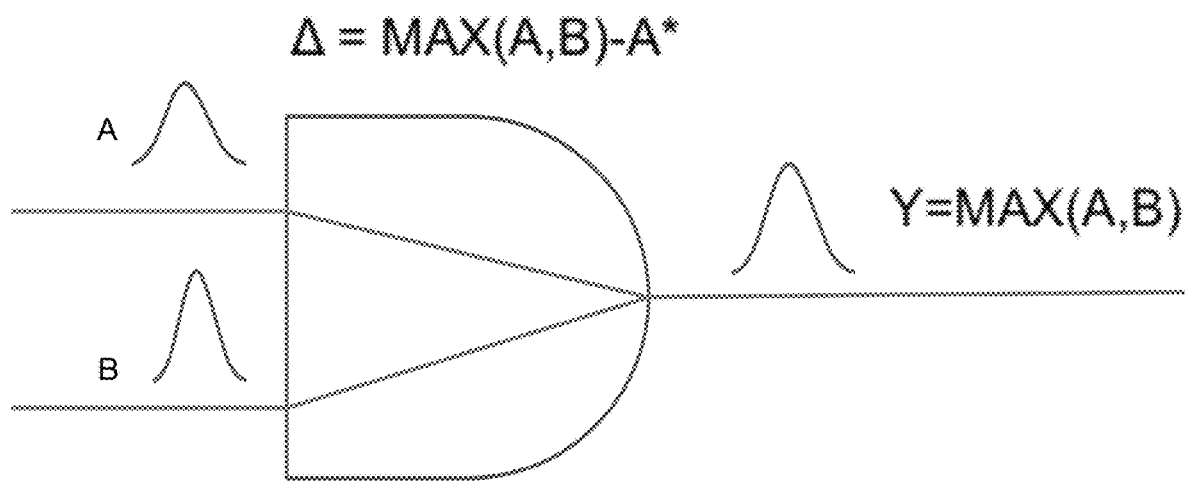
FIG. 7A shows a simple example for the slack adjustment.

FIG. 7A shows a simple example for slack adjustment. In this example, output distribution Y is more pessimistic than both input A and B. During path searching, the process identified slack at A as more pessimistic than slack B. In scalar-value based timing analysis slack at node A is guaranteed to match slack at Y. However, when A B and Y are statistical distributions, this is no longer guaranteed. The process constructs the merging pessimism item ($\Delta$=MAX (A,B)-A*) to bridge the difference during path searching and added the accumulated merging pessimism during backward path tracing. The newly introduced merging pessimism item guarantees critical path slack matches graph slack. It also makes sure that the extracted paths are strictly in proper order based on path slack.

Figure 7B:
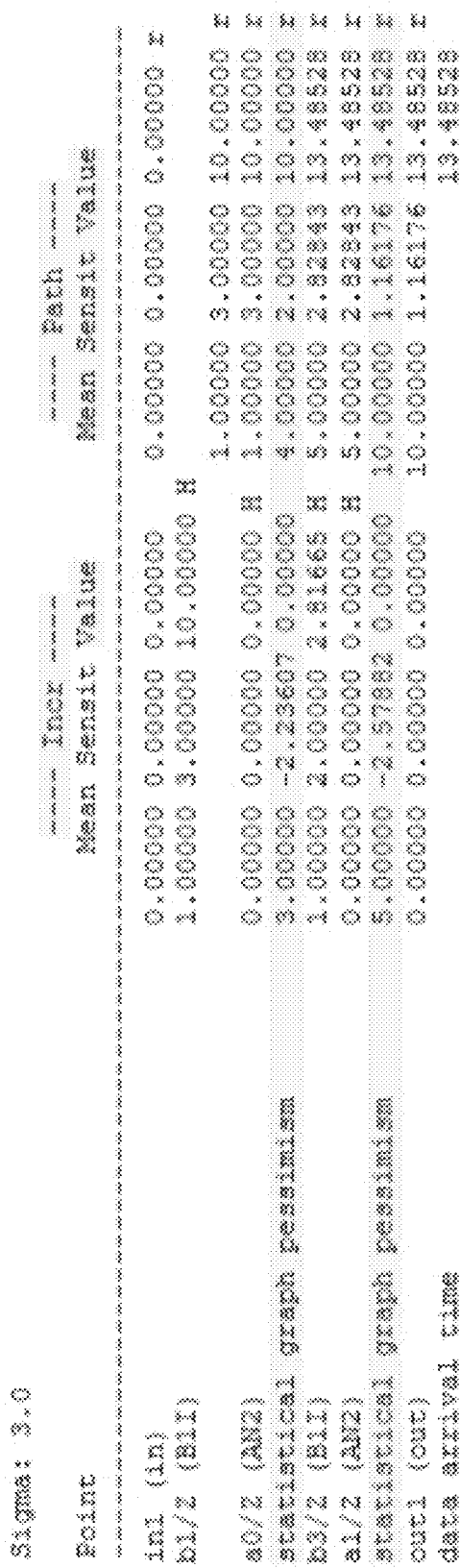
FIG. 7B shows timing report examples with statistical adjustment.

FIG. 7B shows timing report examples with statistical adjustment. It's apparent that the statistical adjustment happens where the pessimistic merge occurs so that the output slack is worse than the worst slacks of all inputs. With statistical adjustment, the process can guarantee that path slack matches graph slack. This reduces pessimism. It also ensures that path order is by graph order.

Figure 7C:
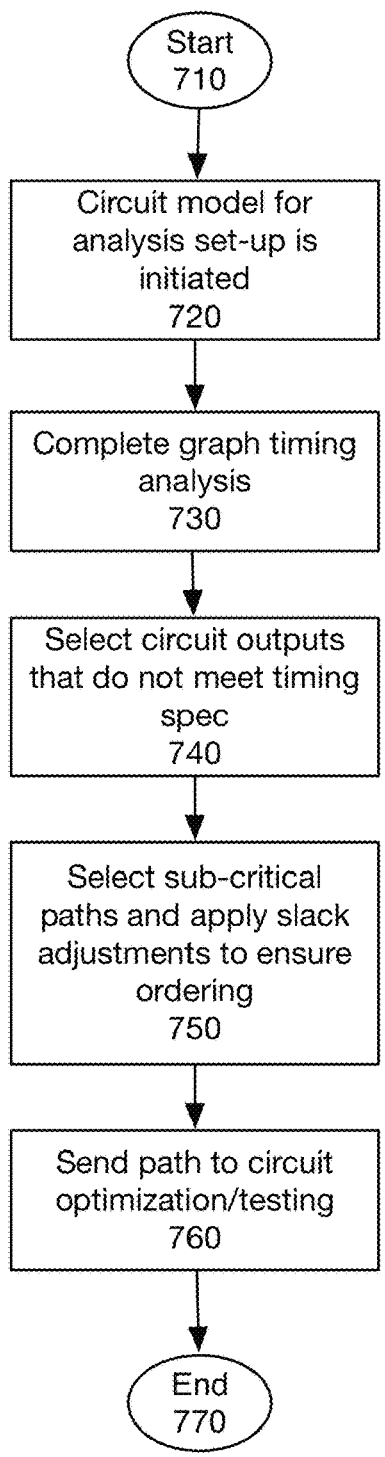
FIG. 7C is a flowchart showing one embodiment of a method to calculate continuous slack adjustment to ensure continuous critical path distribution.

FIG. 7C is a flowchart showing one embodiment of a method to calculate continuous slack adjustment to ensure continuous critical path distribution. The method completes graph timing analysis (block 730), selects circuit outputs that do not meet the timing spec (block 740), selects sub-critical paths and applies slack adjustments to ensure continuous path slack ordering (block 750), and sends the path to circuit optimization and/or circuit testing (block 760).

Figure 7D:
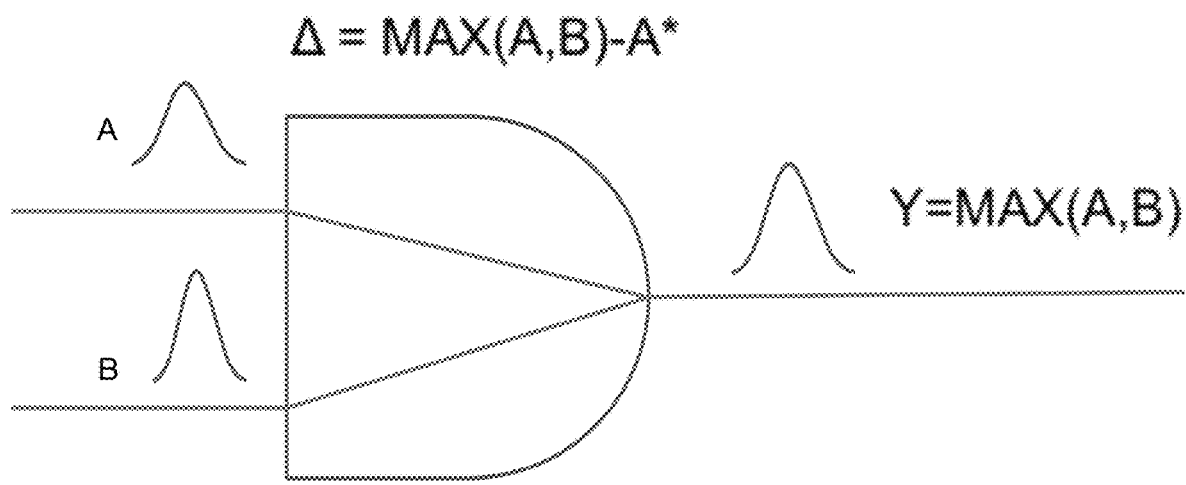
FIG. 7D shows a simple example in which the same adjustment is added to all non-critical fan-in pins to create a smooth slack.

Certain embodiments of the present invention also employ a method to distribute the statistical adjustment to ensure continuous path ordering between topologically correlated paths Statistical graph slack adjustment is calculated as the slack difference between driver pin and critical fan-in pin to ensure consistency between critical path slack and graph slack. In one embodiment, the same adjustment is added to all non-critical fan-in pins to create a smooth slack transition to non-critical paths on the statistical timing graph as shown in FIG. 7D.

The table shown in FIG. 7E shows the results from three in-house designs with and without described process on path tracing with statistical slack adjustment. As can be seen the new algorithm completely fixed the out of order path extracting issues on these designs.

Figure 8:
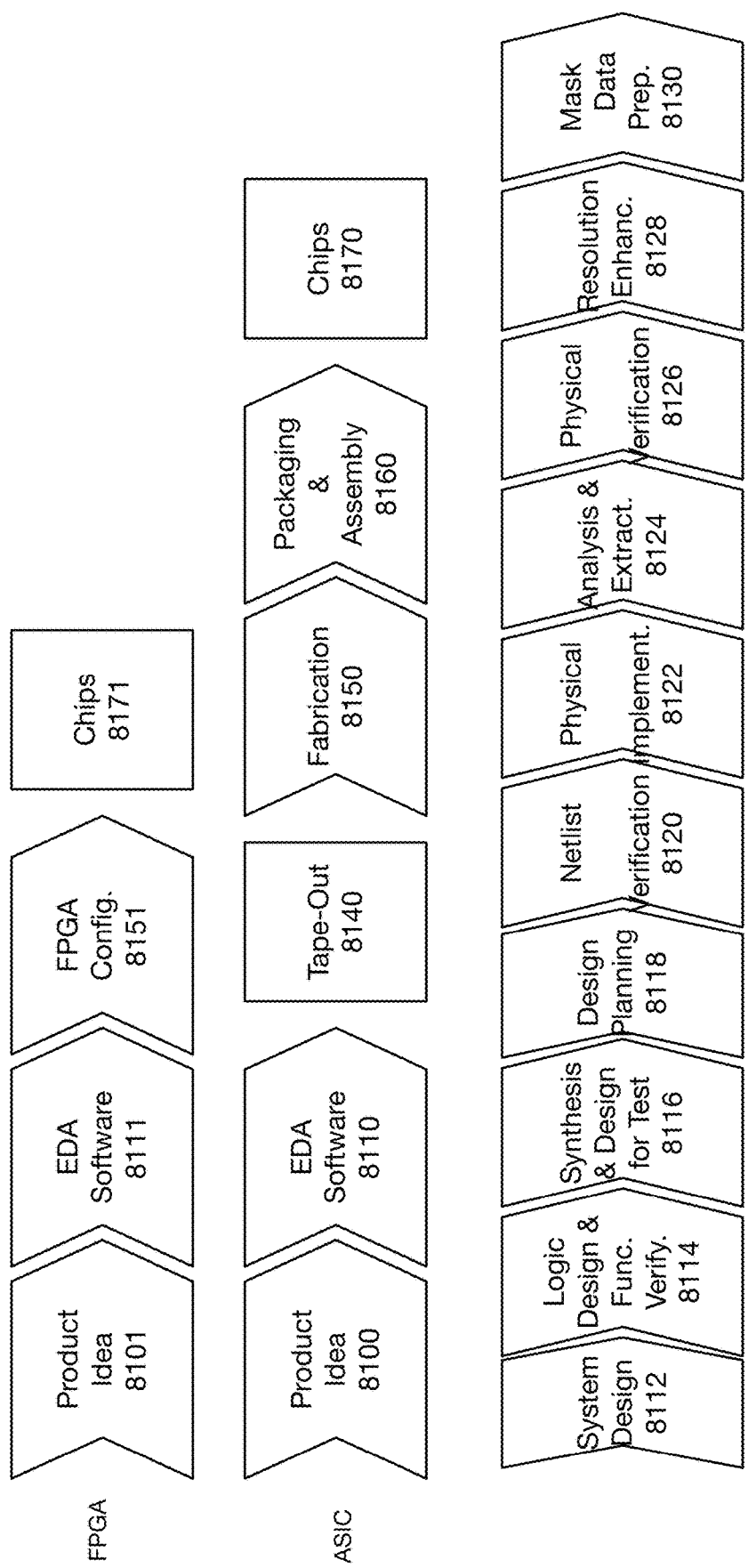
FIG. 8 shows one embodiment of an electronic design automation process, in which the described embodiments of the present invention may be used.

In one embodiment, the system described is part of one or more electronic design automation (EDA) tools and used to design, calibrate, and adjust circuit designs, and circuit blocks. An EDA flow can include multiple steps, and each step can involve using one or more EDA software tools. Some EDA steps and software tools are described below, with respect to FIG. 8. These examples of EDA steps and software tools are for illustrative purposes only and are not intended to limit the embodiments to the forms disclosed.

To illustrate the EDA flow, consider an EDA system that receives one or more high level behavioral descriptions of an IC device (e.g., in HDL languages like VHDL, Verilog, etc.) and translates ("synthesizes") this high-level design language description into netlists of various levels of abstraction. A netlist describes the IC design and is composed of nodes (functional elements) and edges, e.g., connections between nodes. At a higher level of abstraction, a generic netlist is typically produced based on technology independent primitives.

The generic netlist can be translated into a lower level technology-specific netlist based on a technology-specific (characterized) cell library that has gate-specific models for each cell (functional element). The models define performance parameters for the cells; e.g., parameters related to the operational behavior of the cells, such as power consumption, delay, transition time, and noise. The netlist and cell library are typically stored in computer readable media within the EDA system and are processed and verified using many well-known techniques.

Before proceeding further with the description, it may be helpful to place these processes in context. At a high level, for an application specific integrated circuit (ASIC), the process starts with the product idea (step 8100) and is realized in an EDA software design process (step 8110). When the design is finalized, it can be taped-out (event 8140). After tape out, the fabrication process (step 8150) and packaging and assembly processes (step 8160) occur resulting, ultimately, in finished chips (result 8170). For a field programmable gate array (FPGA), the process starts with the product idea (step 8101) and is realized in an EDA software design process (step 8111). When the design is finalized, the FPGAs may be configured (event 8151), applying the code to the FPGA circuits, resulting, ultimately, in finished chips (result 8171).

The EDA software design process (step 8110/8111) is actually composed of a number of steps 8112-8130, shown in linear fashion for simplicity. In an actual design process, the particular design might have to go back through steps until certain tests are passed. Similarly, in any actual design process, these steps may occur in different orders and combinations. This description is therefore provided by way of context and general explanation rather than as a specific, or recommended, design flow for a particular circuit design.

A brief description of the components steps of the EDA software design process (step 8110) will now be provided:

System design (step 8112): The designers describe the functionality that they want to implement and can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 8114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 8116): Here, the VHDL/Verilog is translated into a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Design planning (step 8118): Here, an overall floorplan for the chip is constructed and analyzed for timing and top-level routing. Exemplary EDA software products from Synopsys, Inc. that can be used at this step include Jupiter and Floorplan Compiler products.

Netlist verification (step 8120): At this step, the netlist is checked for compliance with timing constraints and for correspondence with the VHDL/Verilog source code. Exemplary EDA software products from Synopsys, Inc. that can be used at this step include VCS, VERA, Formality and PrimeTime products.

Physical implementation (step 8122): The placement (positioning of circuit elements) and routing (connection of the same) occurs at this step. Exemplary EDA software products from Synopsys, Inc. that can be used at this step include the Astro product.

Analysis and extraction (step 8124): At this step, the circuit function is verified at a transistor level, this in turn permits what-if refinement. Exemplary EDA software products from Synopsys, Inc. that can be used at this step include Star RC/XT, Raphael, and Aurora products. For FPGA design, in one embodiment the process ends here. Because FPGA programming is done through software, there are no physical configuration, resolution, and mask design issues.

For ASICS, next comes the Physical verification (step 8126): At this step, various checking functions are performed to ensure correctness for: manufacturing, electrical issues, lithographic issues, and circuitry. Exemplary EDA software products that may be used at this step include the Hercules product.

Resolution enhancement (step 8128): This step involves geometric manipulations of the layout to improve manufacturability of the design. Exemplary EDA software products from Synopsys, Inc. that can be used at this step include iN-Phase, Proteus, and AFGen products.

Mask data preparation (step 8130): This step provides the "tape-out" data for production of masks for lithographic use to produce finished chips. Exemplary EDA software products from Synopsys, Inc. that can be used at this step include the CATS(R) family of products.

The described systems and methods are designed to be utilized to produce an integrated circuit with proper timing limitations, built via an EDA system.

In one embodiment, the determination of moment conjugation and moment negation and determination of a statistical slack value and a slack adjustment value and path may be implemented in the logic design and functional verification 8114, and analysis and optimization 8124 portions of the EDA process.

Figure 9:
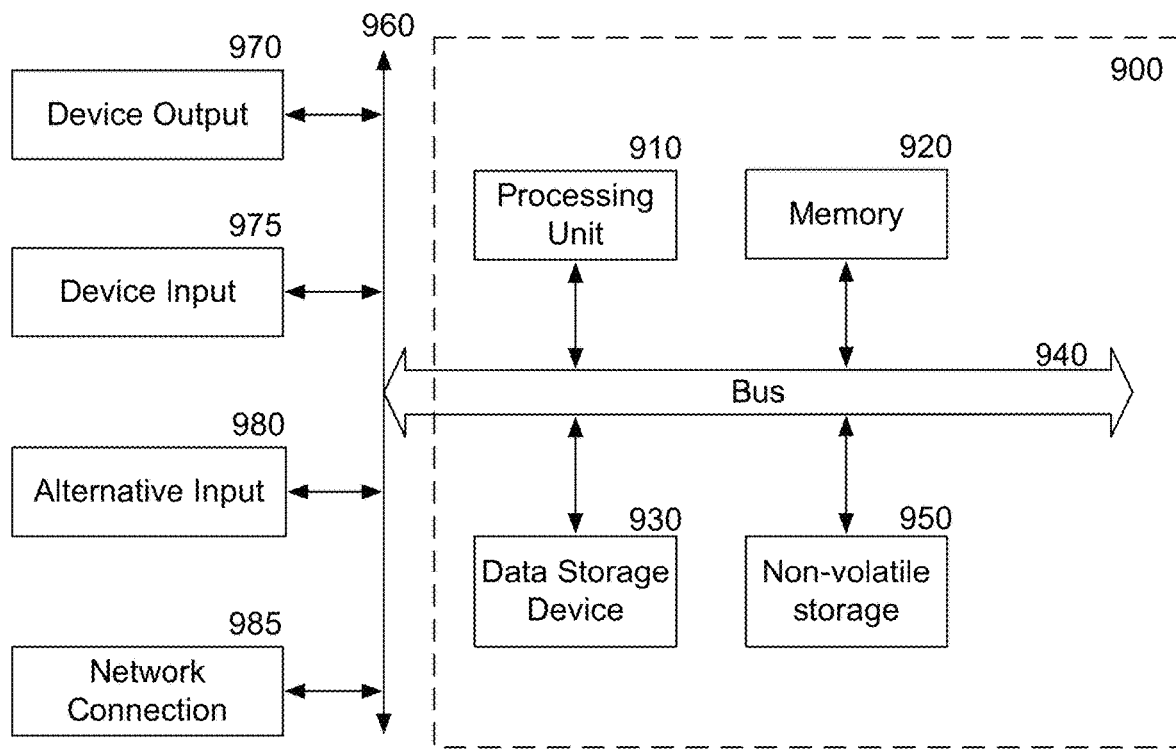
FIG. 9 is an exemplary data processing system in which the described embodiment of the present invention may be used in one embodiment.

FIG. 9 is a block diagram of one embodiment of a computer system that may be used with the present invention. It will be apparent to those of ordinary skill in the art, however that other alternative systems of various system architectures may also be used.

The data processing system illustrated in FIG. 9 includes a bus or other internal communication means 940 for communicating information, and a processing unit 910 coupled to the bus 940 for processing information. The processing unit 910 may be a central processing unit (CPU), a digital signal processor (DSP), or another type of processing unit 910.

The system further includes, in one embodiment, a random access memory (RAM) or other volatile storage device 920 (referred to as memory), coupled to bus 940 for storing information and instructions to be executed by processor 910. Main memory 920 may also be used for storing temporary variables or other intermediate information during execution of instructions by processing unit 910.

The system also comprises in one embodiment a read only memory (ROM) 950 and/or static storage device 950 coupled to bus 940 for storing static information and instructions for processor 910. In one embodiment, the system also includes a data storage device 930 such as a magnetic disk or optical disk and its corresponding disk drive, or Flash memory or other storage which is capable of storing data when no power is supplied to the system. Data storage device 930 in one embodiment is coupled to bus 940 for storing information and instructions.

The system may further be coupled to an output device 970, such as a cathode ray tube (CRT) or a liquid crystal display (LCD) coupled to bus 940 through bus 960 for outputting information. The output device 970 may be a visual output device, an audio output device, and/or tactile output device (e.g. vibrations, etc.)

An input device 975 may be coupled to the bus 960. The input device 975 may be an alphanumeric input device, such as a keyboard including alphanumeric and other keys, for enabling a user to communicate information and command selections to processing unit 910. An additional user input device 980 may further be included. One such user input device 980 is cursor control device 980, such as a mouse, a trackball, stylus, cursor direction keys, or touch screen, may be coupled to bus 940 through bus 960 for communicating direction information and command selections to processing unit 910, and for controlling movement on display device 970.

Another device, which may optionally be coupled to computer system 900, is a network device 985 for accessing other nodes of a distributed system via a network. The communication device 985 may include any of a number of commercially available networking peripheral devices such as those used for coupling to an Ethernet, token ring, Internet, or wide area network, personal area network, wireless network or other method of accessing other devices. The communication device 985 may further be a null-modem connection, or any other mechanism that provides connectivity between the computer system 900 and the outside world.

Note that any or all of the components of this system illustrated in FIG. 9 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 920, mass storage device 930, or other storage medium locally or remotely accessible to processor 910.

It will be apparent to those of ordinary skill in the art that the system, method, and process described herein can be implemented as software stored in main memory 920 or read only memory 950 and executed by processor 910. This control logic or software may also be resident on an article of manufacture comprising a computer readable medium having computer readable program code embodied therein and being readable by the mass storage device 930 and for causing the processor 910 to operate in accordance with the methods and teachings herein.

The present invention may also be embodied in a handheld or portable device containing a subset of the computer hardware components described above. For example, the handheld device may be configured to contain only the bus 940, the processor 910, and memory 950 and/or 920.

The handheld device may be configured to include a set of buttons or input signaling components with which a user may select from a set of available options. These could be considered input device #1 975 or input device #2 980. The handheld device may also be configured to include an output device 970 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 910, a data storage device 930, a bus 940, and memory 920, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 985.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 910. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method of performing timing analysis for a circuit model stored in a memory of a computer, the circuit model representing an integrated circuit, comprising the method comprising:
   obtaining and storing in the memory a plurality of moments for a distribution of a timing value of a path of the circuit model;
   performing a conjugation operation on a first subset of the plurality of moments to yield a "moment conjugation" for the first subset;
   performing a negation operation on a second subset of the plurality of moments of the distribution to yield a "moment negation" of the second subset; and
   using the moment conjugation and the moment negation to determine a timing analysis of the circuit model;
   wherein the timing analysis is used to update the path of the circuit model, for use in manufacturing the integrated circuit.

2. A computer-implemented method of timing analysis for a circuit model stored in a memory of a computer, comprising the method performed by the computer of:
   obtaining and storing in the memory a plurality of moments for a distribution of a timing value of a path of the circuit model;
   performing a conjugation operation on a first subset of the plurality of moments to yield a "moment conjugation" for the first subset;
   performing a negation operation on a second subset of the plurality of moments of the distribution to yield a "moment negation" of the second subset; and
   using the moment conjugation and the moment negation to determine a statistical graph slack value that bounds a path slack value of the path of the circuit model.

3. The method of claim 2, wherein the first subset is even moments for the distribution of the path.

4. The method of claim 2, wherein the second subset is odd moments for the distribution of the path.

5. The method of claim 2 where the distribution is a statistical distribution model.

6. The method of claim 2, where the distribution is a scalar timing model.

7. The method of claim 2, wherein using the moment conjugation and the moment negation to determine a statistical graph slack value comprises:
   determining, for a node in the circuit model a statistical max "NewMax" for two arrival times A and B, where C is a common arrival time for A and B, "−" indicates the negation operation, and * indicates the conjugation operation, and where the NewMax is calculated as: NewMax(A,B)=C+Max(A−C*, B−C*).

8. The method of claim 7 wherein p and a are a nominal and sigma of the distribution and are determined as:

$$\mu_{crp} = \text{Min}(\mu_{arr\_rise\_late}, \mu_{arr\_rise\_early}, \mu_{arr\_fall\_late}, \mu_{arr\_fall\_early})$$

$$\sigma^2_{crp} = \sigma^2_{arr\_rise\_late} + \sigma^2_{arr\_fall\_late}$$

where indices arr_[rise|fall]_[early|late] are the related min/max rise/fall arrival times.

9. The method of claim 8, further comprising:
   applying a borrowed time variation model, where ĉl is the proposed closing edge, cl is the existing calculated closing edge:

$$\hat{cl} = (\hat{\mu}_{cl}, \hat{\sigma}_{cl}) = \sigma_{crparr} \leq \sigma_{arr}, \hat{\mu}_{cl} = \min(\mu_{cl}, \mu_{cl} + N^*(\sigma_{cl} - \hat{\sigma}cl)).$$

10. The method of claim 2, wherein the plurality of moments for the distribution of the timing value comprise at least two of: mean, standard deviation, skewness, kurtosis.

11. The method of claim 2, further comprising:
   using the moment conjugation and the moment negation to determine a slack adjustment value that ensures that critical path slack matches graph slack of the circuit model.

12. The method of claim 11 wherein the slack adjustment Δ for two arrival times A and B, is determined as: Δ=MAX(A,B)−A*
   where "−" indicates the negation operation, and "*" indicates the conjugation operation.

13. A system to enable design of an integrated circuit, including timing analysis for the integrated circuit, the system comprising:
   a processor to determine a plurality of moments for a distribution of a timing value of a path of the circuit model;
   a memory to store the plurality of moments;
   the processor to perform a conjugation operation on a first subset of the plurality of moments to yield a "moment conjugation" for the first subset;
   the processor to perform a negation operation on a second subset of the plurality of moments of the distribution to yield a "moment negation" of the second subset; and
   wherein the moment conjugation and the moment negation is used to determine a timing analysis of the circuit model;
   wherein the timing analysis of the circuit model is used to design the paths for the integrated circuit.

14. The system of claim 13, wherein the moment conjugation and the moment negation is used to determine a statistical graph slack value that bounds a path slack value of the path of the circuit model.

15. The system of claim 13, wherein the first subset is even moments for the distribution of the path, and the second subset is odd moments for the distribution of the path.

16. The system of claim 13, where the distribution is one of a statistical distribution model and scalar timing model.

17. The system of claim 13, wherein using the moment conjugation and the moment negation to determine a statistical graph slack value comprises determining, for a node in the circuit model a statistical max "NewMax" for two arrival times A and B, where C is a common arrival time for A and B, "−" indicates the negation operation, and * indicates the conjugation operation, and where the NewMax is calculated as: NewMax(A,B)=C+Max(A−C*, B−C*).

18. The system of claim 17, wherein p and a are a nominal and sigma of the distribution and are determined as:

$$\mu_{crp} = \text{Min}(\mu_{arr\_rise\_late}, \mu_{arr\_rise\_early}, \mu_{arr\_fall\_late}, \mu_{arr\_fall\_early})$$

$$\sigma^2_{crp} = \sigma^2_{arr\_rise\_late} + \sigma^2_{arr\_fall\_late}$$

where indices arr_[rise|fall]_[early|late] are the related min/max rise/fall arrival times.

19. The system of claim 13, wherein the moment conjugation and the moment negation is used to determine a slack adjustment value that ensures that critical path slack matches graph slack of the circuit model.

20. The system of claim 19, wherein the slack adjustment Δ for two arrival times A and B, is determined as: Δ=MAX(A,B)−A* where "−" indicates the negation operation, and "*" indicates the conjugation operation.

21. A computer-implemented method of timing analysis for a circuit model stored in a memory a computer, comprising the method performed by the computer of:
   obtaining and storing in the memory a plurality of moments for a distribution of a timing value of a path of the circuit model, wherein the circuit model has at least ten thousand circuit elements;
   performing a conjugation operation on a first subset of the plurality of moments to yield a "moment conjugation" for the first subset;
   performing a negation operation on a second subset of the plurality of moments of the distribution to yield a "moment negation" of the second subset; and
   using the moment conjugation and the moment negation to determine a timing analysis of the circuit model, the timing analysis used in a design of an integrated circuit.

* * * * *